Patented Jan. 3, 1933

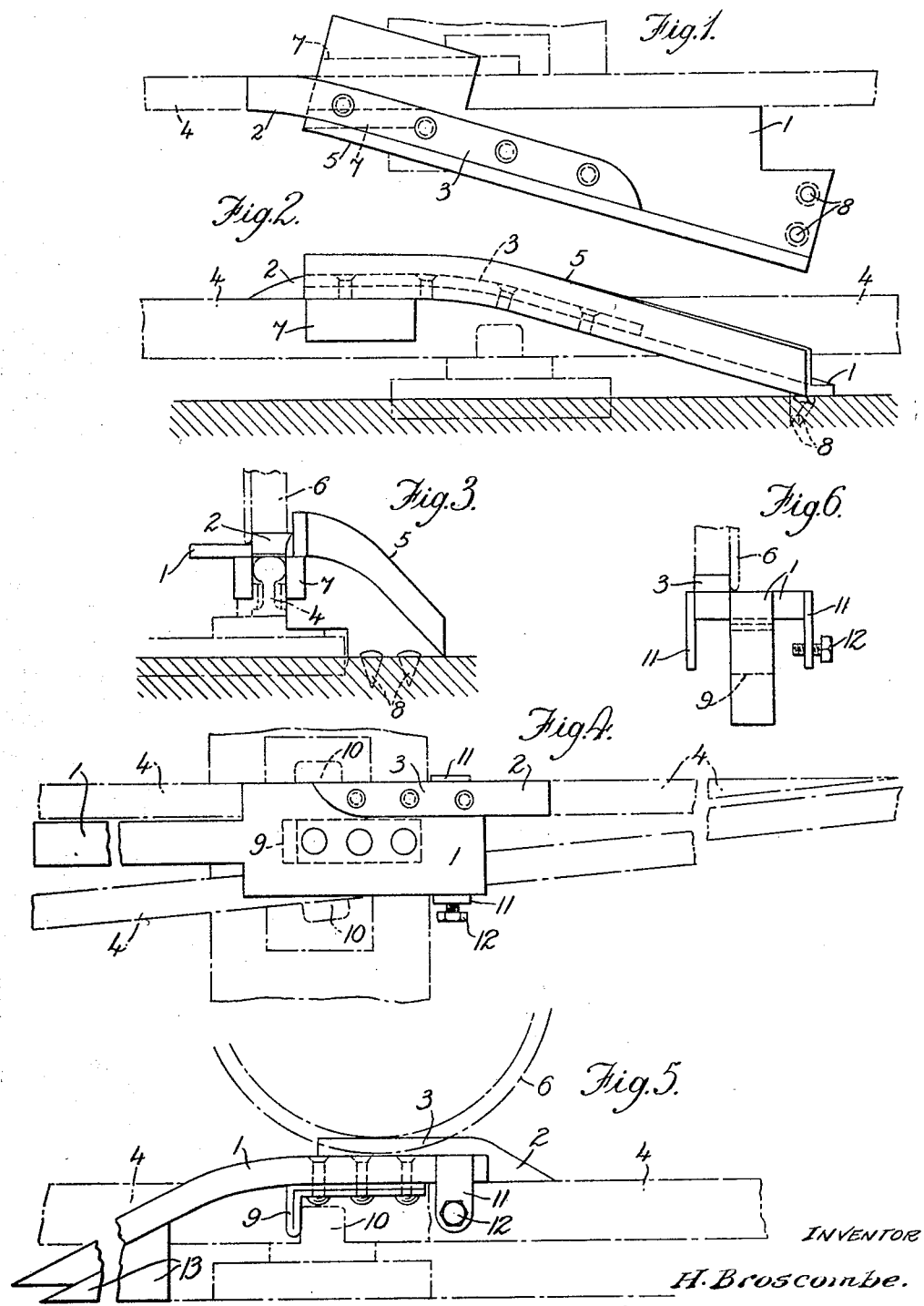

1,892,977

UNITED STATES PATENT OFFICE

HENRY BROSCOMBE, OF LEEDS, ENGLAND, ASSIGNOR OF ONE-HALF TO ALBERT FIELDHOUSE KELLETT, OF LEEDS, ENGLAND

RAMP FOR USE IN RERAILING VEHICLES

Application filed June 8, 1931, Serial No. 542,958, and in Great Britain June 24, 1930.

This invention relates to ramps for use in re-railing locomotives and other rail vehicles, and of the type comprising metal plates or wedges adapted when in position to overhang the rails and afford inclined surfaces up which the wheels of the vehicle run, the rear of the ramp plate or wedge being provided with an extension upon which the tread of the wheel bears and which is adapted to take the thrust of the wheel flange and afford an inclined plane down which the wheel runs on to the rail track.

Now the object of the present invention is the provision of a new or improved ramp of the type specified of simple, cheap and efficient construction.

According to the invention, the rear extension of the ramp is in the form of a rearwardly extending tongue integral with the ramp plate or wedge or afforded by a metal plate bolted or otherwise fixed to the upper surface of the ramp plate or wedge, the portion projecting beyond the latter being bevelled or tapered off to afford a rearwardly and downwardly extending inclined surface in alignment with the rail of the track to which the ramp is applied.

In order that the invention may be clearly understood and readily carried into effect, the same will now be more fully described with reference to and by the aid of the accompanying drawing, in which:—

Figures 1, 2 and 3 are a plan view, side elevation and end elevation respectively of one form of ramp constructed according to the invention and applied to one of the rails of a track.

Figures 4 and 5 are similar views to Figures 1 and 2 respectively, but show a modified form of ramp applied to points.

Figure 6 is a similar view to Figure 3, but the rails are omitted for the sake of clearness.

Referring more particularly to Figures 1, 2 and 3 of the drawing, the rear of the ramp plate or wedge 1 is provided with an extension 2 afforded by a metal plate 3 formed on the upper surface of the ramp 1, the extension portion 2 of said plate 3 being bevelled or tapered off to afford a rearwardly and downwardly extending inclined surface in alignment with the rail 4 of the track to which the ramp is applied. The metal plate 3 is shaped to conform with and abut against the upstanding flange 5 of the ramp 1, and the thickness of said metal plate 3 is slightly greater than the depth of the wheel flange so that when the wheel 6 rides up the ramp 1, the wheel tyre will ride on to the metal plate and thereby remove the load from the wheel flange. The width of the plate 3 is slightly greater than the width of the wheel tyre so that the inner edge or vertical face of said metal plate will serve as a guide engaging the adjacent face of the wheel flange whilst that part of the metal plate 3 forming the extension 2 is bevelled or cut away (in the case of a ramp situated outside the track) to permit of the passage of the wheel flange and guide it along the edge of the rail 4. The forward end of the plate 3 is also curved in order to guide the wheel flange as the wheel runs up the ramp 1. The ramp 1 is positioned angularly relatively to the rail 4 by means of the usual depending flanges 7 and is provided with spikes 8 to give a firm grip on the ground, whilst if desired a wedge may be used to support the inclined portion. Figures 4, 5 and 6 (in which like references to those in Figures 1, 2 and 3 indicate like parts) show a modified form of ramp suitable for use between points. The forward sloping portion of the ramp 1 is cut away or recessed so as to form a narrow extension in line with the top or flat part which latter rests on both converging rails and is provided with a depending bracket 9 adapted to engage the rail chairs 10, whilst in order to prevent side play said top portion is also provided with depending lugs 11, one of which has a set screw 12 to allow adjustment to fit different sizes of points. The extension 2 is afforded by a metal plate 3 having a curved forward end to guide the wheel 6 and a bevelled or tapered rear end 2 to afford a downwardly inclined surface which is in alignment with the rail 4 of the track on to which the wheel is to be run. A wedge 13 is provided to support the sloping portion of the ramp and said sloping portion may also be provided with spikes as in the previous embodiment.

In the case of a ramp for tramway rails the flanges or projections 7 on the underside of the ramp plate may be adapted to engage the groove in the rail and the ramp plate may be adapted to lie on the ground so as to lead the wheel into the groove.

What I claim is:—

1. A ramp consisting of an inclined body adapted to fit against the side of a track rail and provided at its upper end with a lateral extension adapted to extend over and rest upon the track rail, and a wheel-supporting element extending longitudinally of the body on the upper surface thereof and projecting beyond the upper end of the body, the projecting end of said element being tapered and alined with the track rail to guide a car wheel onto the rail and the opposite end of said element being beveled to engage and deflect a car wheel flange, said element having a plane top surface of a width at least equal to a wheel tread and the thickness of said element being greater than the height of a car wheel flange whereby the wheel flange will be relieved of an imposed weight.

2. A ramp consisting of an inclined body adapted to fit against the side of a track rail and provided at its upper end with a lateral extension adapted to extend over and rest upon the rail, and a wheel-supporting element extending longitudinally of the body on the upper surface thereof and projecting beyond the upper end of the body, the projecting end of said element being tapered and alined with the track rail to guide a car wheel onto the rail and the opposite end of said element being beveled to engage and deflect a car wheel flange, said element having a plane top surface of a width at least equal to a wheel tread and the thickness of said element being greater than the height of a car wheel flange whereby the wheel flange will be relieved of an imposed weight, the wheel-supporting element being disposed over and alined with the track rail and the inclined portion of the body being narrower than the upper portion thereof whereby to lie between adjacent rail points.

3. A ramp consisting of an inclined body adapted to fit against the side of a track rail and provided at its upper end with a lateral extension adapted to extend over and rest upon the rail, a wheel-supporting element extending longitudinally of the body on the upper surface thereof and projecting beyond the upper end of the body, the projecting end of said element being tapered and alined with the track rail to guide a car wheel onto the rail and the opposite end of said element being beveled to engage and deflect a car wheel flange, said element having a plane top surface of a width at least equal to a wheel tread and the thickness of said element being greater than the height of a car wheel flange whereby the wheel flange will be relieved of an imposed weight, the wheel-supporting element being disposed over and alined with the track rail and the inclined portion of the body being narrower than the upper portion thereof whereby to lie between adjacent rail points, and a chair-engaging bracket on the underside of the body.

In testimony whereof I have hereunto signed my name.

HENRY BROSCOMBE.